(12) United States Patent
Nishinakamura et al.

(10) Patent No.: US 11,577,189 B2
(45) Date of Patent: Feb. 14, 2023

(54) LIQUID RECOVERY DEVICE

(71) Applicants: DENSO CORPORATION, Kariya (JP); TOYOTA JIDOSHA KABUSHIKI KAISHA, Toyota (JP)

(72) Inventors: Kazutoshi Nishinakamura, Kariya (JP); Ryo Yoshioka, Toyota (JP); Takahiro Yamafuji, Nagoya (JP)

(73) Assignees: DENSO CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 414 days.

(21) Appl. No.: 16/795,434

(22) Filed: Feb. 19, 2020

(65) Prior Publication Data

US 2020/0179849 A1    Jun. 11, 2020

Related U.S. Application Data

(63) Continuation of application No. PCT/JP2018/016385, filed on Apr. 23, 2018.

(30) Foreign Application Priority Data

Sep. 29, 2017   (JP) .............................. JP2017-190183

(51) Int. Cl.
    *B01D 45/02*      (2006.01)
(52) U.S. Cl.
    CPC .......... *B01D 45/02* (2013.01); *B01D 2257/80* (2013.01)

(58) Field of Classification Search
    CPC .............. B01D 45/02; B01D 2257/80; H01M 2250/20; H01M 8/04156; Y02T 90/40; Y02E 60/50
    See application file for complete search history.

(56) References Cited

FOREIGN PATENT DOCUMENTS

| CN | 104632591 A | * | 5/2015 | |
|---|---|---|---|---|
| JP | 2005147482 A | | 6/2005 | |
| JP | 2005169349 A | | 6/2005 | |
| JP | 2008051344 A | | 3/2008 | |
| WO | WO-2004020106 A1 | * | 3/2004 | .............. B04C 5/20 |
| WO | WO-2006035176 A1 | * | 4/2006 | .............. C01B 3/382 |
| WO | WO-2013008368 A1 | * | 1/2013 | ........ H01M 8/04619 |
| WO | WO-2014045510 A1 | * | 3/2014 | ........ H01M 8/04186 |
| WO | WO-2019054072 A1 | * | 3/2019 | |

* cited by examiner

*Primary Examiner* — Joseph J Dallo
(74) *Attorney, Agent, or Firm* — Harness, Dickey & Pierce, P.L.C.

(57) ABSTRACT

A liquid recovery device includes: an outer pipe that includes an introduction portion into which a gas-liquid two-phase fluid is introduced; an inner pipe disposed inside the outer pipe at a position where the introduction portion is extended to a downstream side in a flow direction of the gas-liquid two-phase fluid; a double pipe portion that includes a clearance part provided between an inner side of the outer pipe and the inner pipe at a downstream side of the outer pipe in the flow direction; a communication hole that communicates the inner side of the inner pipe with the clearance part; and a drainage portion connected to the clearance part to discharge the liquid-phase fluid flowing into an interior of the clearance part.

9 Claims, 8 Drawing Sheets

LIQUID RECOVERY DEVICE

CROSS REFERENCE TO RELATED APPLICATION

The present application is a continuation application of International Patent Application No. PCT/JP2018/016385 filed on Apr. 23, 2018, which designated the U.S. and claims the benefit of priority from Japanese Patent Application No. 2017-190183 filed on Sep. 29, 2017. The entire disclosures of all of the above applications are incorporated herein by reference.

TECHNICAL FIELD

The present disclosure relates to a liquid recovery device.

BACKGROUND ART

A liquid recovery device is disposed in a system using a fluid such as a vapor, a compressed air, or various gases. The liquid recovery device is configured to separate a fluid in a gas-liquid two-phase state into a gas phase and a liquid phase, and recovers the separated fluid in a liquid-phase state for various applications.

SUMMARY

According to an aspect of the present application, a liquid recovery device includes:

an outer pipe that includes an introduction portion into which a gas-liquid two-phase fluid is introduced;

an inner pipe disposed inside the outer pipe at a position where the introduction portion is extended to a downstream side in a flow direction of the gas-liquid two-phase fluid in the introduction portion to discharge a gas-phase fluid separated from the gas-liquid two-phase fluid;

a double pipe portion that includes a clearance part provided between an inner side of the outer pipe and the inner pipe, the inner pipe being located at a predetermined distance from the inner side of the outer pipe at a downstream side of the outer pipe in the flow direction;

a communication hole that communicates the inner side of the inner pipe with the clearance part; and a drainage portion connected to the clearance part to discharge the liquid-phase fluid flowing into an interior of the clearance part.

DESCRIPTION OF EMBODIMENTS

Figure 1:
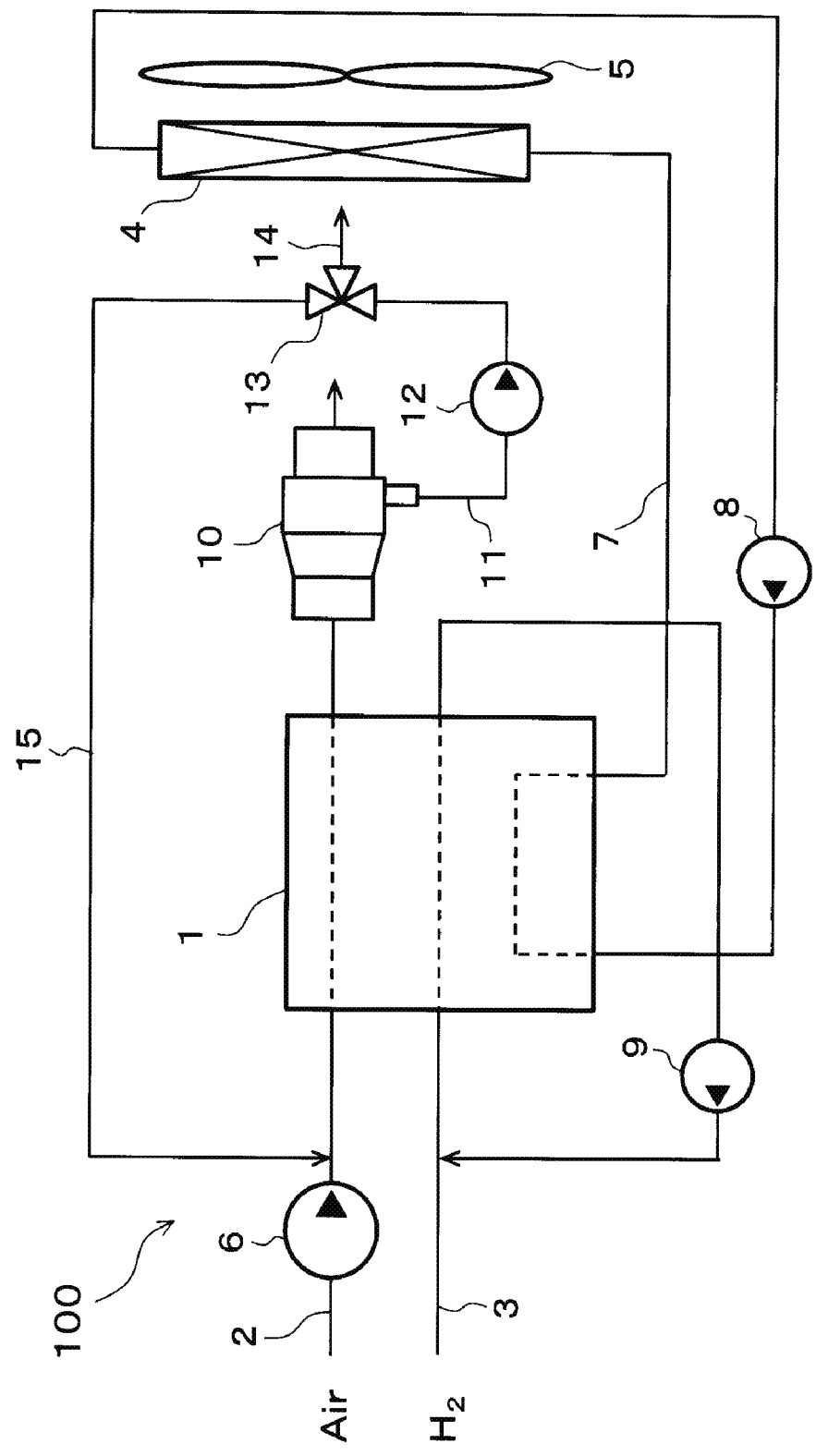
FIG. 1 is a configuration diagram of a fuel cell system including a liquid recovery device according to a first embodiment.

To begin with, examples of relevant techniques will be described.

A gas-liquid separator is configured to have a double structure of a tubular member by disposing a cylindrical liquid collecting member along an inner peripheral wall surface of a separator casing through which a gas-liquid two-phase fluid flows.

In the gas-liquid separator, a gas-liquid two-phase fluid is separated into a fluid in a gas-phase state and a fluid in a liquid-phase state when flowing into a clearance part between the inner peripheral wall surface of the separator casing and a surface of the liquid collecting member. The separated fluid in the liquid-phase state flows along the inner peripheral wall surface of the separator casing.

A liquid discharge port is provided in the clearance part between the separator casing and the liquid collecting member, and is configured to recover the separated fluid in the liquid-phase state through the liquid discharge port.

In a system using a liquid recovery device, a state of the gas-liquid two-phase fluid flowing into the liquid recovery device is not always a predetermined state. For example, when the liquid recovery device is applied to a fuel cell system, the state of exhaust of a fuel cell as a gas-liquid two-phase fluid is changed in various manners due to a load fluctuation or the like. For that reason, the liquid recovery device is required to maintain a high recovery rate of the liquid-phase fluid under a wide range of conditions.

In the liquid recovery device such as the gas-liquid separator, when a flow rate of the gas-liquid two-phase fluid is large, a flow of the gas-phase fluid in the clearance part stagnates, and a vortex flow is generated in the inflow portion where the fluid flows into the clearance part. Since the vortex flow acts to inhibit the movement of the liquid-phase fluid toward the clearance part, a recovery rate of the liquid-phase fluid by the liquid discharge port is lowered.

The present disclosure provides a liquid recovery device capable of realizing a high recovery rate of a liquid-phase fluid under a wide range of conditions of a gas-liquid two-phase fluid.

According to an aspect of the present application, a liquid recovery device includes:

an outer pipe that includes an introduction portion into which a gas-liquid two-phase fluid is introduced;

an inner pipe disposed inside the outer pipe at a position where the introduction portion is extended to a downstream side in a flow direction of the gas-liquid two-phase fluid in the introduction portion to discharge a gas-phase fluid separated from the gas-liquid two-phase fluid;

a double pipe portion that includes a clearance part provided between an inner side of the outer pipe and the inner pipe, the inner pipe being located at a predetermined distance from the inner side of the outer pipe at a downstream side of the outer pipe in the flow direction;

a communication hole that communicates the inner side of the inner pipe with the clearance part; and a drainage portion connected to the clearance part to discharge the liquid-phase fluid flowing into an interior of the clearance part.

According to the liquid recovery device, the gas-liquid two-phase fluid introduced from the introduction portion of the outer pipe is made to pass through the double pipe portion including the outer pipe and the inner pipe, thereby being capable of separating the liquid-phase fluid and the gas-phase fluid from each other, and recovering the separated liquid-phase fluid through the drainage portion.

In the liquid recovery device, since the clearance part in the double pipe portion and the inside of the inner pipe are communicated with each other by the communication hole, a part of the gas-phase fluid flowing into the clearance part flows into the inside of the inner pipe without stagnating inside the clearance part.

As a result, according to the liquid recovery device, the flow of the gas-phase fluid inside the clearance part is smoothed by the communication hole, thereby being capable of increasing the fluid flow velocity of the gas-phase fluid flowing into the clearance part, and reducing the difference in flow velocity with respect to the flow velocity of the gas-phase fluid flowing into the inner pipe.

As a result, according to the liquid recovery device, even when the flow rate of the gas-liquid two-phase fluid introduced from the introduction portion increases, the generation of the vortex flow in the portion where the fluid flows into the clearance part can be inhibited. In other words, in the liquid recovery device, even when the flow rate of the gas-liquid two-phase fluid increases, the liquid-phase fluid moving along the inner surface of the outer pipe can smoothly flow into the clearance part and the drainage portion, and the liquid-phase fluid can be recovered with a high recovery rate.

Hereinafter, embodiments will be described according to the drawings. Same or equivalent portions among respective embodiments below are labeled with same reference numerals in the drawings.

First Embodiment

A liquid recovery device 10 according to the first embodiment is mounted on an electric vehicle (fuel cell vehicle) that travels with a fuel cell 1 as a power source, and configures a part of a fuel cell system 100. The fuel cell system 100 is configured to supply an electric power generated by the fuel cell 1 to an electric device (not illustrated) such as a traveling electric motor or a battery.

First, a configuration of the fuel cell system 100 according to the first embodiment will be described with reference to FIG. 1. As shown in FIG. 1, the fuel cell system 100 according to the first embodiment includes a fuel cell 1 (FC stack) that generates an electric power with the use of a chemical reaction between hydrogen and oxygen.

The fuel cell 1 is a polymer electrolyte fuel cell (PEFC), and is configured by combining a large number of cells. Each cell is formed by sandwiching an electrolyte membrane between a pair of electrodes.

An air containing oxygen is supplied to the fuel cell 1 through an air passage 2. An air pump 6 is disposed in the air passage 2, and the air is pumped by the operation of the air pump 6 to be supplied to the fuel cell 1. Hydrogen is supplied to the fuel cell 1 through a hydrogen passage 3.

In the fuel cell 1, the following electrochemical reaction of hydrogen and oxygen occurs to generate an electric energy. Unreacted oxygen and hydrogen not used in the electrochemical reaction are discharged from the fuel cell 1 as an exhaust gas and an exhaust hydrogen. Incidentally, the unreacted exhaust hydrogen is returned to the hydrogen passage 3 again in accordance with the operation of the hydrogen pump 9, and is supplied to the fuel cell 1.

(Negative electrode) $H_2 \rightarrow 2H^+ + 2e^-$ (Positive electrode) $2H^+ + \frac{1}{2}O_2 + 2e^- \rightarrow H_2O$ For the electrochemical reaction, the electrolyte membrane in the fuel cell 1 needs to be in a wet state containing a moisture. The fuel cell system 100 is configured to humidify the electrolyte membrane in the fuel cell 1 by humidifying air and hydrogen to be supplied to the fuel cell 1 and supplying those humidified gases to the fuel cell 1.

In the fuel cell 1, heat and moisture are generated by an electrochemical reaction during power generation. In consideration of the power generating efficiency of the fuel cell 1, the fuel cell 1 needs to be maintained at a constant temperature (for example, about 80° C.), while the fuel cell system 100 is operating. Further, if the electrolyte membrane inside the fuel cell 1 exceeds a predetermined allowable upper limit temperature, the electrolyte membrane is destroyed by a high temperature. For that reason, there is a need to keep the temperature of the fuel cell 1 at or below the allowable temperature.

As shown in FIG. 1, a coolant water circuit is disposed in the fuel cell system 100, and a temperature of the fuel cell 1 is controlled by cooling the fuel cell 1 with the use of the coolant water as a heat medium. As the coolant water as the heat medium, for example, a mixed solution of ethylene glycol and water can be used in order to prevent freezing at a low temperature.

The coolant water circuit includes a radiator 4, a fan 5, a coolant water flow channel 7, and a water pump 8, and is configured to circulate the coolant water between the fuel cell 1 and the radiator 4, thereby discharging a heat generated in the fuel cell 1 to the outside of the system.

The radiator 4 is a heat exchanger configured to radiate the heat generated in the fuel cell 1 to the outside of the system. In the fuel cell system 100, the coolant water of the coolant water circuit absorbs and flows out a heat generated by the electrochemical reaction in a process of flowing through the fuel cell 1, and flows into the radiator 4 through the coolant water flow channel 7.

In the radiator 4, a heat exchange between the coolant water and the atmosphere is performed, and the heat of the coolant water is radiated to the atmosphere. Thereafter, the coolant water flows from the radiator 4 toward the fuel cell 1, and circulates through the coolant water flow channel 7 of the coolant water circuit. In other words, the radiator 4 cools the fuel cell 1 by radiating the heat generated by the electrochemical reaction of the fuel cell 1 by the heat exchange with the coolant water as a heat medium.

The radiator 4 include the fan 5. The fan 5 assists the heat exchange of the coolant water in the radiator 4 by blowing the outside air, which is a heat exchange target in the radiator 4, to the radiator 4.

The water pump 8 is disposed in the coolant water flow channel 7 as a circulation path including the fuel cell 1 and the radiator 4, and pumps the coolant water to circulate the coolant water in the coolant water flow channel 7.

In the fuel cell system 100, the temperature control of the coolant water in the coolant water circuit is performed by a flow rate control by the water pump 8 and a blowing air volume control by the fan 5. A water temperature sensor (not shown) is disposed on an outlet side of the fuel cell 1 in the coolant water flow channel 7. The water temperature sensor detects the temperature of the coolant water flowing out from the outlet side of the fuel cell 1.

In the fuel cell system 100, moisture generated during power generation by the fuel cell 1 is discharged from the fuel cell 1 through the air passage 2 in a state of being contained in air (that is, in a gas-liquid two-phase state). For that reason, the liquid recovery device 10 is disposed on a downstream side of the fuel cell 1 in the air passage 2. In other words, a flow direction of the fluid from the fuel cell 1 to the liquid recovery device 10 corresponds to a flow direction of the gas-liquid two-phase fluid.

The liquid recovery device 10 takes in the moisture generated at the time of power generation in the fuel cell 1 together with the air discharged from the air passage 2, and separates the moisture into water vapor and water. The water vapor separated by the liquid recovery device 10 is discharged to the outside of the fuel cell system 100.

The water separated by the liquid recovery device 10 is recovered in the liquid recovery device 10 in a state in which the temperature is lowered by condensation, and is used for humidification of the fuel cell 1 or the like. In other words, the liquid recovery device 10 functions as the liquid recovery device in the present disclosure. A specific configuration of the liquid recovery device 10 will be described later in detail with reference to the drawings.

In the fuel cell system 100, the recovered water recovered in the liquid recovery device 10 can be used for various applications. Specifically, in the fuel cell system 100, the recovered water is used for humidifying the electrolyte membrane in the fuel cell 1 and cooling the radiator 4. A recovered water flow channel 11 for using the recovered water stored in the liquid recovery device 10 is connected to a lower portion of the liquid recovery device 10.

As shown in FIG. 1, the recovered water flow channel 11 connects the lower portion of the liquid recovery device 10 and a flow rate adjustment valve 13, and a sparging pump 12 is disposed in the recovered water flow channel 11. Therefore, in the fuel cell system 100, the recovered water stored in the liquid recovery device 10 can be pumped to the flow rate adjustment valve 13 by operating the sparging pump 12.

A radiator-side flow channel 14 and a humidification flow channel 15 are connected to the flow rate adjustment valve 13. The radiator-side flow channel 14 is a flow channel for dispersing the recovered water, which is pumped from the inside of the liquid recovery device 10 through the flow rate adjustment valve 13, to the radiator 4 by the operation of the sparging pump 12. A watering nozzle for sparging (jetting) the water in the form of a mist is disposed at a tip portion of the radiator-side flow channel 14.

In the fuel cell system 100, the flow rate adjustment valve 13 is configured to be capable of independently regulating a valve opening degree of the radiator-side flow channel 14 and a valve opening degree of the humidification flow channel 15, and regulates a sparging flow rate of the recovered water in the radiator-side flow channel 14 and a sparging flow rate of the recovered water in the humidification flow channel 15.

The humidification flow channel 15 is a flow channel for sparging the recovered water, which is pumped from the inside of the liquid recovery device 10 through the flow rate adjustment valve 13, to the fuel cell 1 by the operation of the sparging pump 12. A watering nozzle for sparging (jetting) the water in the form of a mist is disposed at a tip portion of the humidification flow channel 15.

More specifically, the sparging nozzle in the humidification flow channel 15 is disposed so as to sparge the recovered water to the downstream side of the air pump 6 in the air passage 2 and supply the recovered water together with the air in the air passage 2 to the fuel cell 1.

The fuel cell system 100 according to the first embodiment includes a control device (not shown). The control device is a control unit that controls the operation of each of the control target devices that configure the fuel cell system 100. The control device is configured by a well-known microcomputer including a CPU, a ROM, a RAM, and the like, and peripheral circuits of the microcomputer.

A fuel cell 1 and a water temperature sensor are connected to an input side of the control device. Therefore, the control device can acquire the output of the fuel cell 1 and the coolant water temperature by the water temperature sensor.

The output side of the control device is connected to the control target devices, such as the hydrogen pump 9, the sparging pump 12, and the flow rate adjustment valve 13. Therefore, the control device can control the operation of the fuel cell system 100 based on a control program stored in the ROM of the control device.

Next, a specific configuration of the liquid recovery device 10 according to the first embodiment will be described in detail with reference to FIGS. 2 to 4. A cross-sectional view shown in FIG. 3 shows a state in which the liquid recovery device 10 is cut in a longitudinal cross section including a center axis C of the outer pipe 20, and a cross-sectional view shown in FIG. 4 shows a state in which the liquid recovery device 10 is cut in a cross-section perpendicular to the center axis C and including positions of communication holes 41 to be described later.

Further, a flow direction in the following description means a flow direction of the gas-liquid two-phase fluid when flowing into the liquid recovery device 10, and it is assumed that the flow direction conforms to the center axis C of the introduction portion 21, which will be described later.

As described above, the liquid recovery device 10 separates the water vapor and the water from the air containing moisture discharged from the fuel cell 1 on the downstream side of the fuel cell 1 in the air passage 2, recovers the water as a liquid, and exhausts the water vapor.

Figure 2:
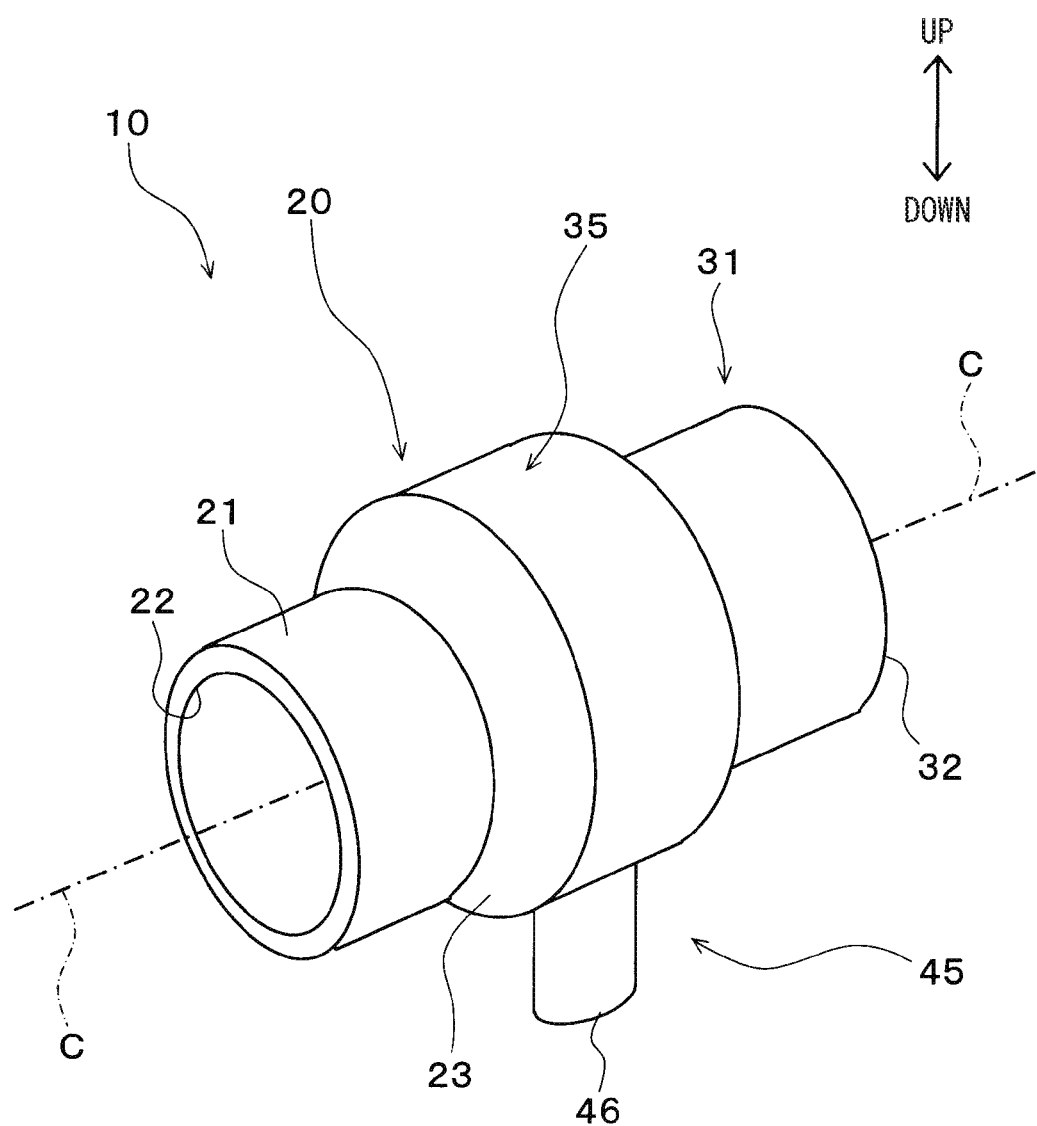
FIG. 2 is an external perspective view of the liquid recovery device according to the first embodiment.
Figure 3:
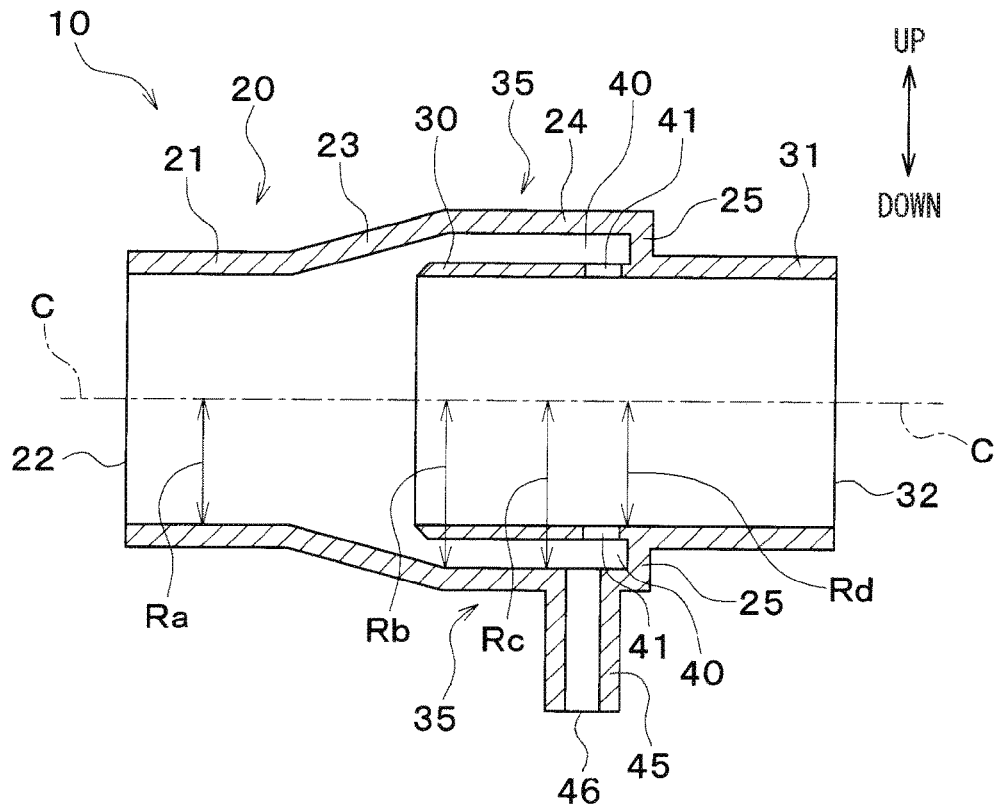
FIG. 3 is a cross-sectional view showing a configuration of the liquid recovery device according to the first embodiment.
Figure 4:
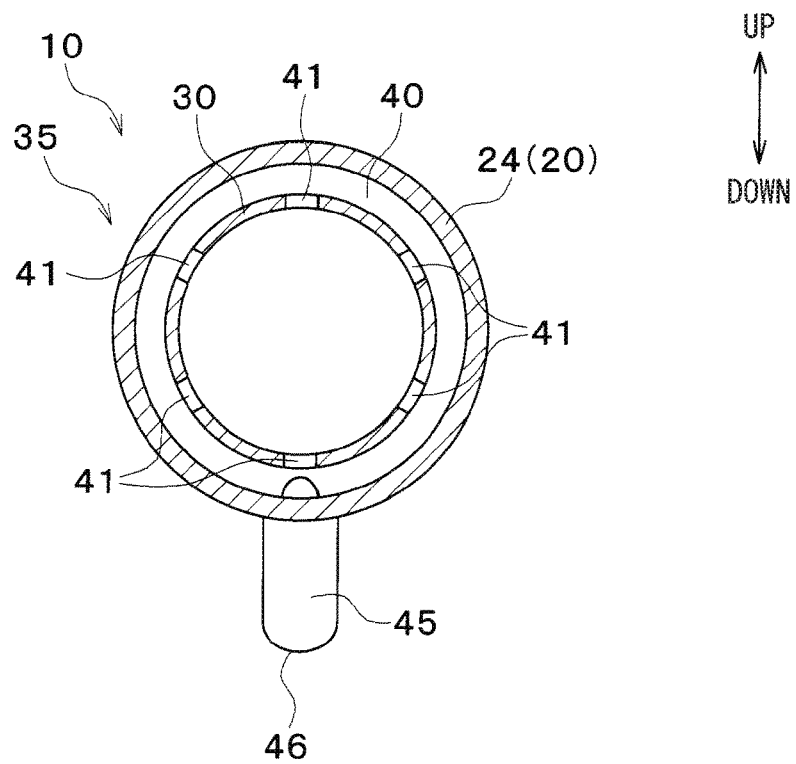
FIG. 4 is a cross-sectional view showing the placement of multiple communication holes in the liquid recovery device according to the first embodiment.

As shown in FIGS. 2 to 4, the liquid recovery device 10 includes an outer pipe 20 configuring an outer shell of the liquid recovery device 10, an inner pipe 30 disposed inside the outer pipe 20, an exhaust pipe 31 through which a gas-phase fluid Fg (that is, water vapor) separated from the gas-liquid two-phase fluid is discharged, and a drainage pipe 45 through which a liquid-phase fluid Fl (that is, water) separated from the gas-liquid two-phase fluid is mainly discharged.

The outer pipe 20 configures an outer shell of the liquid recovery device 10, and has an introduction portion 21, a pipe expansion portion 23, and a downstream portion 24. The outer pipe 20 functions as an outer pipe in the present disclosure. The introduction portion 21 is a portion for introducing the gas-liquid two-phase fluid flowing out of the fuel cell 1 into the inside of the outer pipe 20, and configures the upstream side of the outer pipe 20 in the flow direction. The introduction portion 21 functions as an introduction portion in the present disclosure.

As shown in FIGS. 2 and 3, a flow channel having a circular cross section is provided inside the circular tubular introduction portion 21. In the following description, a center axis of the flow channel in the circular tubular introduction portion 21 is used as the center axis C, and the center axis C is used as a reference. The cross section of the flow channel in the introduction portion 21 shows a circle having a center axis C as a center and a predetermined introduction portion inner diameter Ra as a radius.

An introduction port 22 is defined at one end of the introduction portion 21. The introduction port 22 is connected to the air passage 2 extending downstream in the flow direction from the fuel cell 1. Therefore, the gas-liquid two-phase fluid containing the moisture and water vapor discharged from the fuel cell 1 is introduced into the outer pipe 20 through the air passage 2 and the introduction port 22.

The pipe expansion portion 23 is disposed on the downstream side in the flow direction of the gas-liquid two-phase fluid in the introduction portion 21. The pipe expansion portion 23 according to the first embodiment is formed in a circular tubular shape disposed coaxially with the center axis C of the introduction portion 21, and is configured such that a flow channel cross-sectional area of the pipe expansion portion 23 continuously increases toward the downstream side in the flow direction.

More specifically, the flow channel cross section on the upstream side in the flow direction of the pipe expansion portion 23 is a circle having the center axis C as the center and the introduction portion inner diameter Ra as the radius. As shown in FIG. 3, the flow channel cross-sectional area of the pipe expansion portion 23 continuously increases toward the downstream side in the flow direction.

The cross section of the flow channel on the downstream side in the flow direction of the pipe expansion portion 23 is circular with the center axis C as the center and a maximum inner diameter Rb of the pipe expansion portion as the radius. The maximum inner diameter Rb of the pipe expansion portion is larger than the inner diameter Ra of the introduction portion.

The downstream portion 24 is disposed downstream of the pipe expansion portion 23 in the flow direction. The downstream portion 24 according to the first embodiment is formed in a circular tubular shape disposed coaxially with the center axis C. As shown in FIG. 3, the internal cross section of the downstream portion 24 has a circular shape with the center axis C as the center and a downstream portion inner diameter Rc as the radius.

The inner diameter Rc of the downstream portion is equal to the maximum inner diameter Rb of the pipe expansion portion, and is larger than the inner diameter Ra of the introduction portion. Therefore, the internal cross-sectional area of the downstream portion 24 has the same value as the flow channel cross-sectional area on the downstream side in the flow direction in the pipe expansion portion 23.

The inner surface of the outer pipe 20 is subjected to a process for imparting hydrophilicity. This is because a liquid-phase fluid Fl moving along the inner surface of the outer pipe 20 can be inhibited from peeling off by imparting hydrophilicity. As the process for imparting hydrophilicity, there is a chemical treatment for directly imparting a hydrophilic functional group (for example, a hydroxyl group, a carboxyl group, or the like) to the inner surface of the outer pipe 20.

The inner pipe 30 is disposed inside the outer pipe 20 at a downstream portion of the outer pipe 20 in the flow direction, and is formed in a circular tubular shape. The inner pipe 30 is disposed coaxially with the center axis C of the introduction portion of the outer pipe 20. The inner pipe 30 functions as the inner pipe in the present disclosure.

Figure 6:
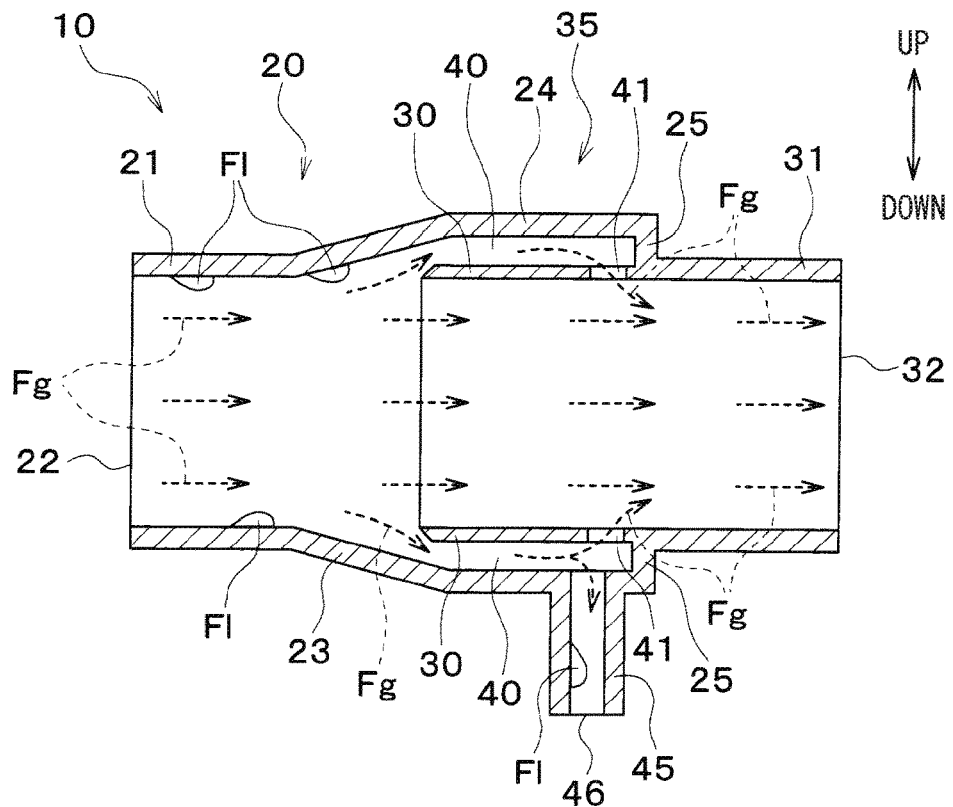
FIG. 6 is an illustrative diagram showing a flow of the gas-liquid two-phase fluid in the liquid recovery device according to the first embodiment.

As shown in FIG. 6, the gas-phase fluid Fg separated from the gas-liquid two-phase fluid mainly flows into the inner pipe 30. The cross section of the flow channel in the inner pipe 30 is shaped in a circle having a center axis C as the center and a predetermined inner pipe inner diameter Rd as the radius. The inner pipe inner diameter Rd according to the first embodiment has the same value as the introduction portion inner diameter Ra.

In other words, in the first embodiment, the flow channel in the inner pipe 30 has the same shape as the flow channel in the introduction portion 21 of the outer pipe 20, and is disposed on an extension line extending the flow channel of the introduction portion 21 to the downstream side in the flow direction.

As shown in FIG. 3, the upstream end portion of the inner pipe 30 in the flow direction is disposed inside the downstream portion of the pipe expansion portion 23 of the outer pipe 20. An end portion of the inner pipe 30 on the downstream side in the flow direction extends to a downstream side wall portion 25 configuring the downstream side of the downstream portion 24 of the outer pipe 20.

The inner pipe 30 is disposed so as to have a predetermined interval from the inner side surface of the outer pipe 20 (that is, the pipe expansion portion 23 and the downstream portion 24). In other words, since the inner pipe 30 is disposed at a distance from the inside of the outer pipe 20 on the downstream side in the flow direction of the outer pipe 20, a double pipe portion 35 in the liquid recovery device 10 is configured.

The exhaust pipe 31 is connected to the downstream side of the inner pipe 30 in the flow direction, and is configured by a circular pipe formed so as to extend from the downstream portion 24 of the outer pipe 20. Therefore, the gas-phase fluid Fg that has passed through the inner pipe 30 flows into the exhaust pipe 31.

A gas phase discharge port 32 is disposed on the downstream side of the exhaust pipe 31 in the flow direction. The gas phase discharge port 32 communicates the inside of the exhaust pipe 31 with the outside of the fuel cell system 100. Therefore, the exhaust pipe 31 discharges the gas-phase fluid Fg to the outside of the fuel cell system 100 through the gas phase discharge port 32.

As shown in FIG. 3, the liquid recovery device 10 has the double pipe portion 35 including the outer pipe 20 and the inner pipe 30. The double pipe portion 35 according to the first embodiment is a portion formed by double placement of the pipe expansion portion 23 and the downstream portion 24 of the outer pipe 20 and the inner pipe 30, and corresponds to the double pipe portion in the present disclosure.

Since the double pipe portion 35 has a predetermined interval between the inner peripheral surface of the outer pipe 20 and the outer peripheral surface of the inner pipe 30, the double pipe portion 35 includes a clearance part 40. The clearance part 40 is disposed between the outer pipe 20 and the inner pipe 30 so as to surround an outer periphery of the inner pipe 30.

The downstream side in the flow direction of the clearance part 40 is closed by the downstream side wall portion 25 extending from the downstream side edge of the downstream portion 24 to the center axis C. The clearance part 40 corresponds to a clearance part in the present disclosure, and the downstream side wall portion 25 corresponds to a downstream side wall portion in the present disclosure.

In the liquid recovery device 10 according to the first embodiment, the double pipe portion 35 functions to branch a flow of the gas-liquid two-phase fluid flowing in from the introduction portion 21 into a flow of the fluid flowing into the inner pipe 30 and a flow of the fluid flowing into the clearance part 40.

As shown in FIGS. 3 and 4, the pipe wall of the inner pipe 30 has multiple communication holes 41. The multiple communication holes 41 (six in the first embodiment) are disposed at regular intervals in a circumferential direction of the inner pipe 30, and are positioned over the entire circumference of the inner pipe 30.

Since each of the communication holes 41 penetrates through the pipe wall of the inner pipe 30, the inside of the inner pipe 30 communicates with the clearance part 40 corresponding to the outside of the inner pipe 30. Therefore, according to the liquid recovery device 10, a part of the gas-phase fluid Fg flowing into the clearance part 40 can be returned to the inside of the inner pipe 30 through each of the communication holes 41. Each of the communication holes 41 corresponds to a communication hole in the present disclosure.

The drainage pipe 45 is connected to a lower portion of the double pipe portion 35, and a liquid phase discharge port 46 is provided at an end portion of the drainage pipe 45. Since the drainage pipe 45 is connected to the recovered water flow channel 11 of the fuel cell system 100 through the liquid phase discharge port 46, the liquid-phase fluid Fl (that is, a generated water) which has flowed into the clearance part 40 can be discharged to the recovered water flow channel 11. The drainage pipe 45 corresponds to a drainage portion in the present disclosure.

As described above, in the fuel cell system 100, the liquid-phase fluid Fl recovered through the drainage pipe 45 of the liquid recovery device 10 is used for various applications for improving the power generation capability of the fuel cell system 100. For example, the liquid phase fluid Fl is used to cool the radiator 4, humidify the electrolyte membrane in the fuel cell 1, and the like.

The drainage pipe 45 may be connected to the lower portion of the double pipe portion 35, and various modes can be adopted as a method of taking out the drainage pipe 45. For example, as shown in FIGS. 2 to 4 and the like, the take-out method is not limited to the example in which the drainage pipe 45 is connected so as to extend downward from the lower surface of the double pipe portion 35, and the drainage pipe 45 may be connected so as to extend horizontally from the downstream side wall portion 25 which corresponds to the lower portion of the double pipe portion 35.

In order to facilitate understanding of the liquid recovery device 10 according to the first embodiment, a gas-liquid separator S of a comparative example will be described with reference to FIG. 5.

First, a configuration of the gas-liquid separator S in the comparative example shown in FIG. 5 will be described. The gas-liquid separator S is configured with the use of an outer pipe Po and an inner pipe Pi different in diameter from each other. The outer pipe Po is a large-diameter cylindrical straight pipe configuring a casing of the gas-liquid separator S, and has an introduction port I into which the gas-liquid two-phase fluid is introduced at an end portion of the outer pipe Po.

The inner pipe Pi is a cylindrical straight pipe having a diameter smaller than an inner diameter of the outer pipe Po, and is mounted coaxially with the outer pipe Po inside the outer pipe Po by welding. An end portion E of the inner pipe Pi on the side of the introduction port I does not extend to the introduction port I of the outer pipe Po, and is located on the downstream side of the introduction port I. A gas discharge port Og is disposed on an opposite side of the inner pipe Pi.

Figure 5:
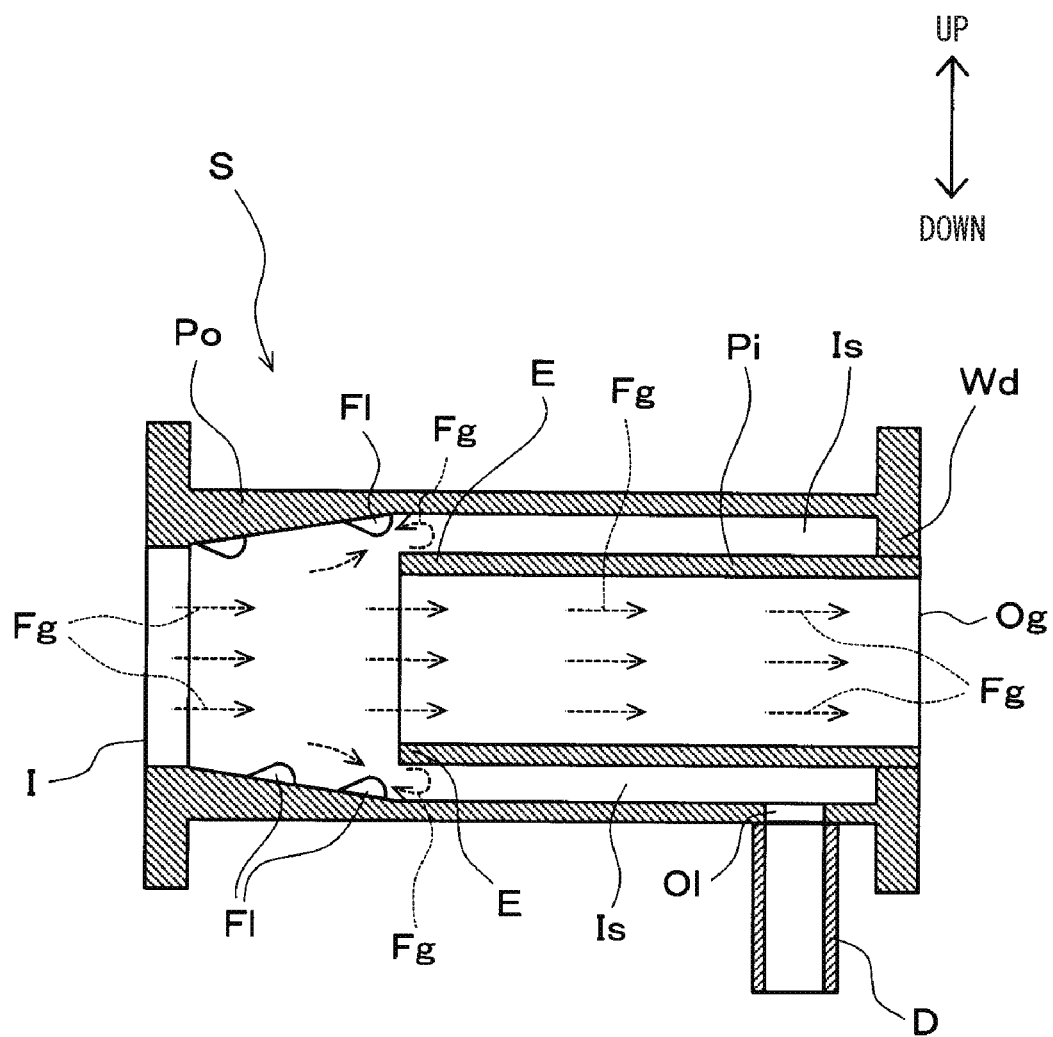
FIG. 5 is an illustrative diagram showing a flow of a gas-liquid two-phase fluid in a gas-liquid separator in a comparative example.

As shown in FIG. 5, a clearance part Is is provided between the large-diameter outer pipe Po and the small-diameter inner pipe Pi so as to surround an outer periphery of the inner pipe Pi. The downstream side of the clearance part Is is closed by a downstream side wall portion Wd. A liquid discharge port Ol is disposed in a lower portion of the outer pipe Po configuring the clearance part Is, and is connected to a tank (not shown) or the like through a liquid discharge pipe D.

Next, the flow of the gas-liquid two-phase fluid inside the gas-liquid separator S will be described. In a process flowing from the introduction port I to the inside of the gas-liquid separator S, the liquid-phase fluid Fl contained in the gas-liquid two-phase fluid flows along the inner peripheral wall surface of the outer pipe Po. In this situation, the gas-phase fluid Fg in the gas-liquid two-phase fluid is divided into an inside of the inner pipe P1 and a clearance part Is disposed around the inner pipe Pi at the end portion E of the inner pipe Pi.

The gas-phase fluid Fg flowing into the inner pipe Pi flows through the inside of the inner pipe Pi as it is, and is discharged from the gas discharge port Og to the outside of the gas-liquid separator S. On the other hand, the gas-phase fluid Fg flowing into the clearance part Is ideally flows into the liquid discharge port Ol and the liquid discharge pipe D through the clearance part Is while sweeping the liquid-phase fluid Fl adhering to the inner peripheral wall surface of the outer pipe Po.

In the gas-liquid separator S as shown in FIG. 5, the flow channel cross-sectional area in the clearance part Is is much smaller than the flow channel cross-sectional area inside the inner pipe Pi, and the flow channel cross-sectional areas of the liquid discharge port Ol and the liquid discharge pipe D are also set to be small.

For that reason, in the gas-liquid separator S, when the flow rate of the gas-liquid two-phase fluid introduced from the introduction port I is large, a pressure loss in the clearance part Is increases, and the flow of the gas-phase fluid Fg from the end portion E of the inner pipe Pi toward the clearance part Is stagnates.

On the other hand, the gas-phase fluid Fg flowing inside the inner pipe Pi flows relatively smoothly because the gas-phase fluid Fg flows in a central portion of the gas-liquid separator S. As a result, in the gas-liquid separator S, a flow velocity difference between a flow velocity of the gas-phase fluid Fg flowing inside the inner pipe Pi and a flow velocity of the gas-phase fluid Fg flowing inside the clearance part Is becomes large.

At this time, the gas-phase fluid Fg divided by the end portion E flows along the outer peripheral surface of the inner pipe Pi around the end portion E of the inner pipe Pi. However, since the flow of the gas-phase fluid Fg and the liquid-phase fluid Fl inside the clearance part Is is stagnated, the gas-phase fluid Fg around the end portion E cannot flow into the clearance part Is any more.

As a result, the gas-phase fluid Fg around the end portion E changes its flow direction to the inner peripheral wall surface side of the outer pipe Po, and then flows toward the introduction port I side along the inner peripheral wall surface of the outer pipe Po. In other words, as shown in FIG. 5, in the gas-liquid separator S, a vortex flow is generated around the end portion E of the inner pipe Pi, and the vortex flow acts in a direction of pushing back the liquid-phase fluid Fl flowing along the inner peripheral wall surface of the outer pipe Po to the side of the introduction port I.

As a result, in the gas-liquid separator S, the flow of the liquid-phase fluid Fl along the inner peripheral wall surface of the outer pipe Po is obstructed by the vortex flow generated around the end portion E of the inner pipe Pi, so that a recovery rate of the liquid-phase fluid Fl is lowered.

Also, a flow of the gas-phase fluid Fg from the end portion E toward the inside of the inner pipe Pi may act on the liquid-phase fluid Fl stagnating around the end portion E of the inner pipe Pi due to the vortex flow. In other words, the gas-phase fluid Fg flowing toward the inside of the inner pipe Pi may scatter a part of the stagnating liquid-phase fluid Fl.

In this case, a part of the liquid-phase fluid Fl scattered by the gas-phase fluid Fg is discharged from the gas discharge port Og through the inside of the inner pipe Pi. In other words, also from the above viewpoint, the gas-liquid separator S lowers the recovery rate of the liquid-phase fluid Fl.

Next, the flow of the gas-liquid two-phase fluid in the liquid recovery device 10 according to the first embodiment will be described with reference to FIG. 6. In the liquid recovery device 10 configured as described above, the gas-liquid two-phase fluid discharged from the fuel cell 1 flows into the inside of the outer pipe 20 from the introduction portion 21 of the outer pipe 20 through the air passage 2.

In a process of flowing from the introduction portion 21 toward the double pipe portion 35, the liquid-phase fluid Fl contained in the gas-liquid two-phase fluid flows along the inner surface of the outer pipe 20. On the other hand, the gas-phase fluid Fg flows in the central portion of the flow channel away from the inner surface of the outer pipe 20. In the central portion of the flow channel of the outer pipe 20, the gas-phase fluid Fg occupies a large part of the central portion, and contains a small amount of mist-like liquid-phase fluid Fl which cannot be visually confirmed.

The liquid-phase fluid Fl basically flows over the entire inner surface of the outer pipe 20. At this time, the liquid-phase fluid Fl in the lower portion of the inner surface of the outer pipe 20 flows more than the upper portion and the side portion of the inner surface of the outer pipe 20 due to a gravitational force acting on the liquid-phase fluid Fl.

When the gas-liquid two-phase fluid flowing in the state shown in FIG. 6 reaches the double pipe portion 35, the flow of the gas-liquid two-phase fluid is branched into a flow of the fluid flowing into the inner pipe 30 and a flow of the fluid flowing into the clearance part 40 at the end portion of the inner pipe 30 in the double pipe portion 35.

In the liquid recovery device 10 according to the first embodiment, the inner pipe 30 is formed so as to have the same flow channel cross-sectional area as that of the introduction portion 21, and is disposed coaxially with the center axis C of the introduction portion 21.

Therefore, according to the liquid recovery device 10, the gas-phase fluid Fg flowing through the central portion of the flow channel in the introduction portion 21 can be allowed to flow smoothly into the inside of the inner pipe 30, and a pressure loss from the introduction portion 21 to the exhaust pipe 31 can be reduced.

The flow channel cross-sectional area of the clearance part 40 is smaller than the flow channel cross-sectional area of the inner pipe 30, but the clearance part 40 and the inside of the inner pipe 30 are connected to each other by the multiple communication holes 41. For that reason, the liquid recovery device 10 can return a part of the gas-phase fluid Fg flowing into the clearance part 40 to the inside of the inner pipe 30 through the multiple communication holes 41.

In other words, even when the flow rate of the gas-liquid two-phase fluid introduced from the introduction portion 21 is increased, the stagnation of the gas-phase fluid Fg or the like inside the clearance part 40 is alleviated by the respective communication holes 41, and the inflow flow velocity of the gas-phase fluid Fg to the clearance part 40 can be improved. As a result, according to the liquid recovery device 10, even in this case, a difference in flow velocity between the inflow flow velocity in the inside of the inner pipe 30 and the inflow flow velocity in the clearance part 40 can be reduced, and the generation of the vortex flow as shown in FIG. 5 can be inhibited.

The liquid-phase fluid Fl adhering to the inner surface of the outer pipe 20 moves to the downstream side along the inner surface of the outer pipe 20 by a wind force of the gas-phase fluid Fg flowing through the inner surface of the outer pipe 20. As described above, the liquid recovery device 10 can inhibit the generation of the vortex flow in the portion where the fluid flows into the clearance part 40 (that is, in the vicinity of the upstream-side end portion of the inner pipe 30) and smoothly move the liquid-phase fluid Fl to the clearance part 40 and the drainage pipe 45, so as to be able to recover the liquid-phase fluid Fl with a high recovery rate.

In the liquid recovery device 10, the drainage pipe 45 is connected to the recovered water flow channel 11 of the fuel cell system 100 through a hose (not shown). Therefore, if the pressure loss in the hose or the recovered water flow channel 11 is large, the inflow of the gas-phase fluid Fg into the clearance part 40 may be affected by the pressure loss.

More specifically, it is assumed that a decrease in the inflow flow velocity of the gas-phase fluid in the clearance part 40 becomes large, and the flow of the liquid-phase fluid Fl is greatly hindered by the vortex flow generated along with the decrease in the inflow velocity of the gas-phase fluid. In this case, the recovery rate of the liquid-phase fluid Fl in the liquid recovery device 10 is lowered.

In this regard, in the liquid recovery device 10 according to the first embodiment, the communication between the inside of the inner pipe 30 and the clearance part 40 through the multiple communication holes 41 makes it possible to reduce the influence of the pressure loss due to the hose, the recovered water flow channel 11, and the like on the inflow flow velocity of the gas-phase fluid into the clearance part 40, and therefore the decrease in the recovery rate of the liquid-phase fluid Fl can be inhibited.

When the communication holes 41 are closed by the liquid-phase fluid Fl and the flow of the gas-phase fluid Fg from the clearance part 40 toward the inside of the inner pipe 30 is blocked, the pressure inside the clearance part 40 is increased by the gas-phase fluid Fg flowing into the clearance part 40.

As the pressure rises, the liquid-phase fluid Fl that has closed the communication holes 41 is pushed out into the inner pipe 30, and is discharged to the outside from the exhaust pipe 31. In other words, when the communication holes 41 are closed by the liquid-phase fluid Fl and the inside of the inner pipe 30 and the clearance part 40 are blocked, the recovery rate of the liquid-phase fluid Fl by the drainage pipe 45 is lowered.

In this regard, in the liquid recovery device 10, as shown in FIGS. 3 and 4, in order to prevent an increase in pressure inside the clearance part 40 due to clogging of the communication holes 41 by the liquid-phase fluid Fl and an outflow of the liquid-phase fluid Fl to the exhaust pipe 31 caused by the increase in pressure, the inside of the inner pipe 30 and the clearance part 40 are communicated with each other by the multiple communication holes 41.

Therefore, even if one of the communication holes 41 is closed by the liquid-phase fluid Fl flowing through the clearance part 40, the flow of the gas-phase fluid Fg from the clearance part 40 toward the inside of the inner pipe 30 can be ensured by the other communication holes 41. For that reason, in the liquid recovery device 10, even when a part of the communication holes 41 is closed by the liquid-phase fluid Fl, the increase in pressure inside the clearance part 40 can be reduced and the decrease in the recovery rate of the liquid-phase fluid Fl can be reduced.

In addition, according to the liquid recovery device 10, the vortex flow is inhibited from being generated in the portion where the fluid flows into the clearance part 40, so that the liquid-phase fluid Fl can be inhibited from stagnating in the periphery of the opening edge of the inner pipe 30. As a result, the liquid recovery device 10 can inhibit a part of the liquid-phase fluid Fl from scattering into the inner pipe 30 by the gas-phase fluid Fg flowing into the inner pipe 30, and can improve the recovery rate of the liquid-phase fluid Fl.

Further, since the hydrophilic property is imparted to the inner surface of the outer pipe 20, the liquid recovery device 10 can inhibit the separation of the liquid-phase fluid Fl adhering to the inner surface of the outer pipe 20. As a result, in the liquid recovery device 10, the liquid-phase fluid Fl adhering to the inner surface of the outer pipe 20 can be inhibited from flowing into the inner pipe 30, and the flow into the liquid-phase recovery portion can be promoted, so that the recovery rate of the liquid-phase fluid Fl can be further enhanced.

As described above, according to the liquid recovery device 10 of the first embodiment, the gas-liquid two-phase fluid introduced from the introduction portion 21 of the outer pipe 20 can be separated into the gas-phase fluid Fg and the liquid-phase fluid Fl by passing through the double pipe portion 35 including the outer pipe 20 and the inner pipe 30, and the separated liquid-phase fluid Fl can be recovered through the drainage pipe 45.

In the liquid recovery device 10, the clearance part 40 in the double pipe portion 35 and the inside of the inner pipe 30 are communicated with each other through the communication holes 41. Therefore, as shown in FIG. 6, in the liquid recovery device 10, a part of the gas-phase fluid Fg flowing into the clearance part 40 flows into the inner pipe 30 without stagnating inside the clearance part 40.

As a result, according to the liquid recovery device 10, the flow of the gas-phase fluid Fg inside the clearance part 40 is smoothed by the communication holes 41, thereby being capable of increasing the fluid flow velocity of the gas-phase fluid Fg flowing into the clearance part 40, and reducing the difference in flow velocity with respect to the flow velocity of the gas-phase fluid Fg flowing into the inner pipe 30.

As a result, according to the liquid recovery device 10, even when the flow rate of the gas-liquid two-phase fluid introduced from the introduction portion 21 increases, the generation of the vortex flow in the portion where the fluid flows into the clearance part 40 can be inhibited. In other words, in the liquid recovery device 10, even when the flow rate of the gas-liquid two-phase fluid increases, the liquid-phase fluid Fl moving along the inner surface of the outer pipe 20 can smoothly flow into the clearance part 40 and the drainage pipe 45, and the liquid-phase fluid Fl can be recovered with a high recovery rate.

As shown in FIG. 4, in the liquid recovery device 10, the communication holes 41 communicate between the inside of the inner pipe 30 and the clearance part 40 at multiple portions.

As a result, even when some communication holes 41 among the multiple communication holes 41 are closed by the liquid-phase fluid FI, the flow of the gas-phase fluid Fg from the clearance part 40 to the inside of the inner pipe 30 can be ensured, and the increase in pressure inside the clearance part 40 can be inhibited. Therefore, according to the liquid recovery device 10, the liquid-phase fluid Fl closing the communication holes 41 can be inhibited from entering the inside of the inner pipe 30 by the pressure of the clearance part 40, and inhibit the decrease in the recovery rate of the liquid-phase fluid Fl.

Second Embodiment

Next, a second embodiment different from the first embodiment described above will be described with reference to FIGS. 7 and 8. A liquid recovery device 10 according to the second embodiment configures a part of a fuel cell system 100 mounted on an electric vehicle (a fuel cell vehicle), as in the first embodiment.

Similarly to the first embodiment, the liquid recovery device 10 according to the second embodiment is disposed on a downstream side of a fuel cell 1 in an air passage 2 of the fuel cell system 100, separates a gas-phase fluid Fg and a liquid-phase fluid Fl from a gas-liquid two-phase fluid discharged from the fuel cell 1, and recovers the liquid-phase fluid Fl.

Similar to the first embodiment, the liquid recovery device 10 includes an outer pipe 20, an inner pipe 30, an exhaust pipe 31, and a drainage pipe 45. In the liquid recovery device 10 according to the second embodiment, the basic configuration is the same as that of the first embodiment described above, but the placement of communication holes 41 in the inner pipe 30 and the configuration of the drainage pipe 45 connected to a clearance part 40 are different from those of the first embodiment.

In the liquid recovery device 10 according to the second embodiment, the drainage pipe 45 is disposed on a lower portion of the double pipe portion 35 and is connected to the clearance part 40. A flow channel through which the liquid-phase fluid Fl flowing in from the clearance part 40 flows is provided in the cylindrical drainage pipe 45. In the following description, a center axis of the cylindrical drainage pipe 45 is referred to as a drainage pipe center Cd.

A liquid phase discharge port 46 is disposed at an end portion of the drainage pipe 45, and is connected to a recovered water flow channel 11 of the fuel cell system 100. Therefore, the drainage pipe 45 can discharge the liquid-phase fluid Fl flowing into the clearance part 40 (that is, the generated water) to the recovered water flow channel 11.

Figure 7:
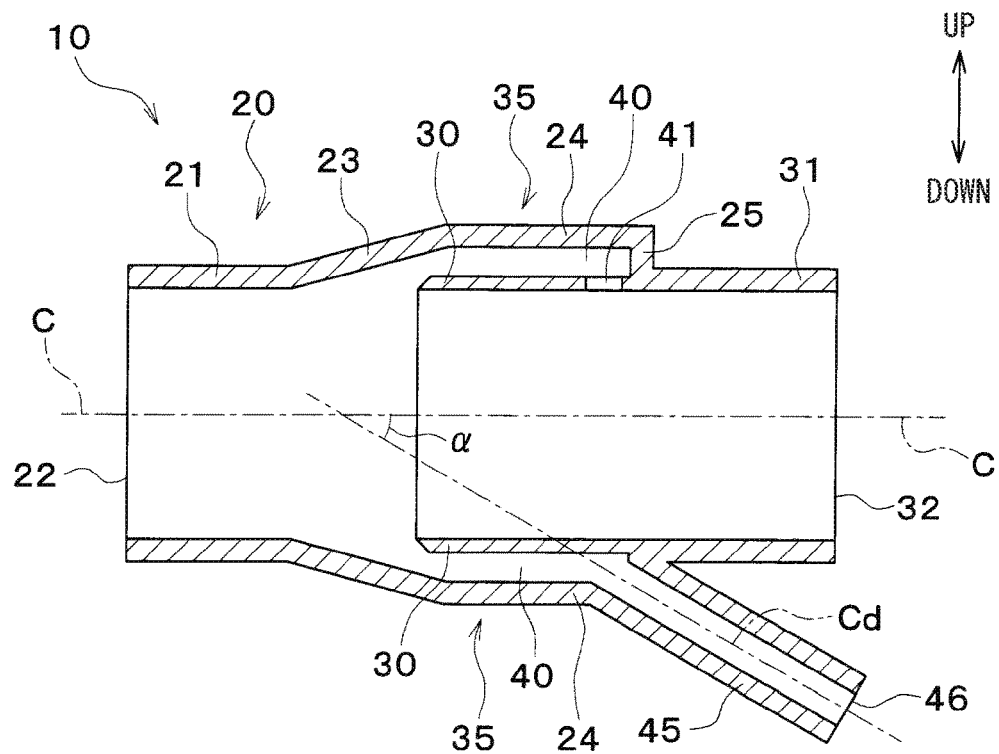
FIG. 7 is a cross-sectional view showing a configuration of a liquid recovery device according to a second embodiment.

As shown in FIG. 7, one end portion of the drainage pipe 45 is connected to the clearance part 40 on the downstream side in the flow direction in the lower portion of the double pipe portion 35. The drainage pipe 45 extends downward from the connection position of the clearance part 40 toward the downstream side in the flow direction.

In other words, the drainage pipe center Cd forms an acute inclination angle α with respect to the center axis C corresponding to an extending direction of the inner pipe 30. The inclination angle α depends on the placement of the respective components in the fuel cell system 100 and the like, but it is desirable that the inclination angle α is as small as possible.

As a result, the liquid recovery device 10 can reduce a head loss when the liquid-phase fluid Fl or the like flows into the drainage pipe 45 through the inside of the clearance part 40, as compared with the case where the drainage pipe 45 is extended downward as in the first embodiment.

As a result, the liquid recovery device 10 can smoothen the flow of the fluid from the clearance part 40 toward the drainage pipe 45, and further inhibit the occurrence of the vortex flow at the portion where the fluid flows into the clearance part 40, thereby being capable of improving the recovery rate of the liquid-phase fluid Fl by the drainage pipe 45.

Figure 8:
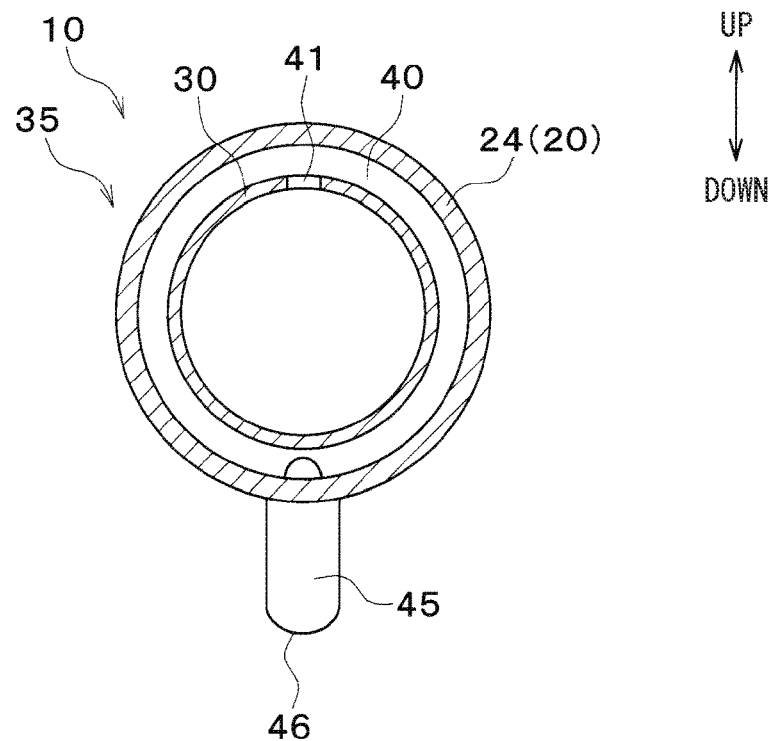
FIG. 8 is a cross-sectional view showing the placement of communication holes in the liquid recovery device according to the second embodiment.

As shown in FIGS. 7 and 8, in the liquid recovery device 10 according to the second embodiment, the communication holes 41 communicate the inside of the inner pipe 30 with the clearance part 40 at an upper portion of the inner pipe 30.

Since gravity acts on the liquid-phase fluid Fl adhering to the inner surface of the outer pipe 20 in a process of moving to the clearance part 40 and the drainage pipe 45, a deviation occurs in the distribution of the liquid-phase fluid Fl on the inner surface of the outer pipe 20. In other words, it is assumed that a large amount of the liquid-phase fluid Fl exists in the lower portion of the clearance part 40 and a small amount of the liquid-phase fluid Fl exists in the upper portion of the clearance part 40.

Therefore, in the second embodiment, it is considered that the upper portion of the inner pipe 30 is a portion on an opposite side of the connection position of the drainage pipe 45 through the inner pipe 30, in which the liquid-phase fluid Fl is small due to the action of gravity. In other words, in the liquid recovery device 10 according to the second embodiment, the communication holes 41 are disposed in the upper portion of the inner pipe 30 so that the liquid-phase fluid Fl can be inhibited from flowing into the inside of the inner pipe 30 through the communication holes 41.

As described above, according to the liquid recovery device 10 of the second embodiment, the gas-liquid two-phase fluid introduced from the introduction portion 21 of the outer pipe 20 can be separated into the gas-phase fluid Fg and the liquid-phase fluid Fl by passing through the double pipe portion 35 including the outer pipe 20 and the inner pipe 30, and the separated liquid-phase fluid Fl can be recovered through the drainage pipe 45.

As shown in FIGS. 7 and 8, the clearance part 40 and the inside of the inner pipe 30 are communicated with each other through the communication holes 41. Therefore, according to the liquid recovery device 10, even when the flow rate of the gas-liquid two-phase fluid introduced from the introduction portion 21 increases, the generation of the vortex flow in the portion where the fluid flows into the clearance part 40 can be inhibited, the flow of the liquid-phase fluid Fl to the clearance part 40 can be smoothed, and the liquid-phase fluid Fl can be recovered with a high recovery rate.

In the liquid recovery device 10, the drainage pipe 45 is connected to the clearance part 40 at the lower portion of the double pipe portion 35, and is disposed so that the drain pipe center Cd forms an acute inclination angle α with respect to the center axis C.

As a result, according to the liquid recovery device 10, the flow of the fluid from the clearance part 40 toward the drainage pipe 45 can be smoothed, and the generation of the vortex flow in the portion where the fluid flows into the clearance part 40 can be further inhibited. As a result, the liquid recovery device 10 can improve the recovery rate of the liquid-phase fluid Fl through the drainage pipe 45.

In the liquid recovery device 10, the communication holes 41 communicate the inside of the inner pipe 30 with the clearance part 40 at the upper portion of the inner pipe 30. The upper portion of the inner pipe 30 is opposite to the connection position of the drainage pipe 45 through the inner pipe 30.

As a result, according to the liquid recovery device 10, since the communication holes 41 are disposed in a portion where the liquid-phase fluid Fl is small in the distribution of the liquid-phase fluid Fl in the clearance part 40 due to the action of gravity, the liquid-phase fluid Fl can be prevented from flowing into the inner portion of the inner pipe 30 through the communication holes 41.

Third Embodiment

Next, a third embodiment different from the embodiments described above will be described with reference to FIGS. 9 and 10. A liquid recovery device 10 according to the third embodiment configures a part of a fuel cell system 100 mounted on an electric vehicle (a fuel cell vehicle), similar to the embodiments described above.

The liquid recovery device 10 according to the third embodiment is disposed on a downstream side of a fuel cell 1 in an air passage 2 of the fuel cell system 100 similarly to the embodiments described above, and separates a gas-phase fluid Fg and a liquid-phase fluid Fl from a gas-liquid two-phase fluid discharged from the fuel cell 1 to recover a liquid-phase fluid Fl.

The liquid recovery device 10 is configured to include an outer pipe 20, an inner pipe 30, an exhaust pipe 31, and a drainage pipe 45, similarly to the embodiments described above. In the liquid recovery device 10 according to the third embodiment, the basic configuration is the same as that of the embodiments described above, but the placement of communication holes 41 in the inner pipe 30 and the configuration of a downstream side wall portion 25 are different from those of the embodiments described above.

Figure 9:
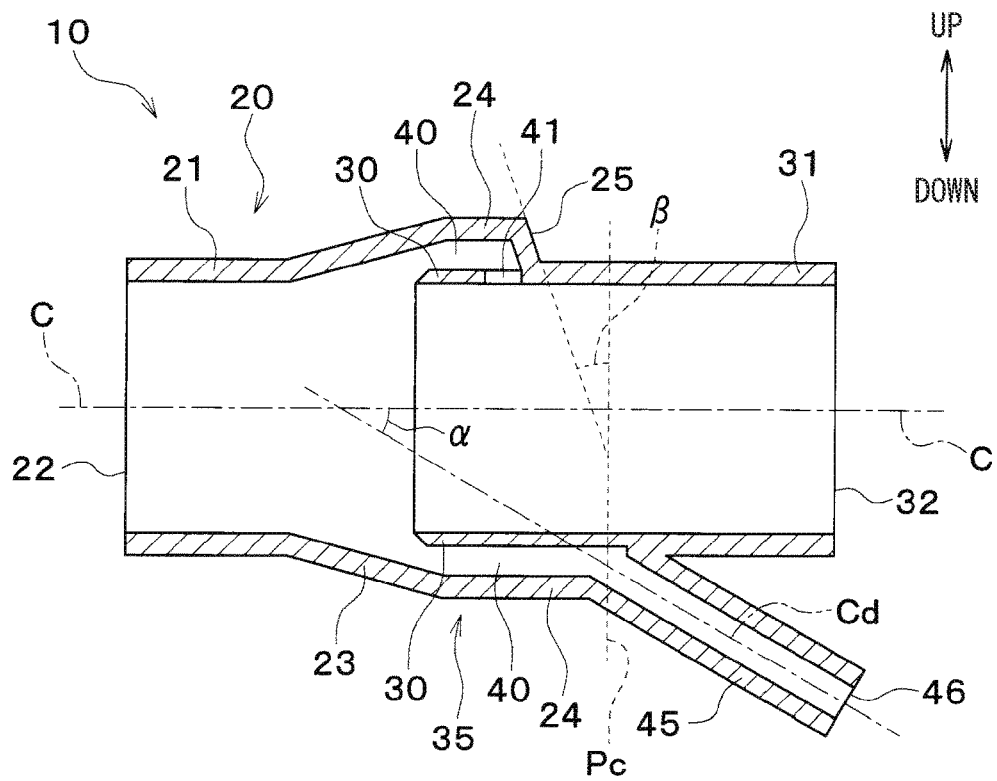
FIG. 9 is a cross-sectional view showing a configuration of a liquid recovery device according to a third embodiment.

As shown in FIG. 9, in the liquid recovery device 10 according to the third embodiment, the drainage pipe 45 is connected to a clearance part 40 on a downstream side in a flow direction in a lower portion of a double pipe portion 35, and extends from a connection position of the clearance part 40 so as to be positioned downward toward the downstream side in the flow direction. In other words, the drainage pipe 45 according to the third embodiment extends so that a drain pipe center Cd forms an acute inclination angle α with respect to a center axis C, similarly to the second embodiment.

As a result, the liquid recovery device 10 can smoothen the flow of the fluid from the clearance part 40 toward the drainage pipe 45, and further inhibit the occurrence of the vortex flow at the portion where the fluid flows into the clearance part 40, thereby being capable of improving the recovery rate of the liquid-phase fluid Fl by the drainage pipe 45.

Figure 10:
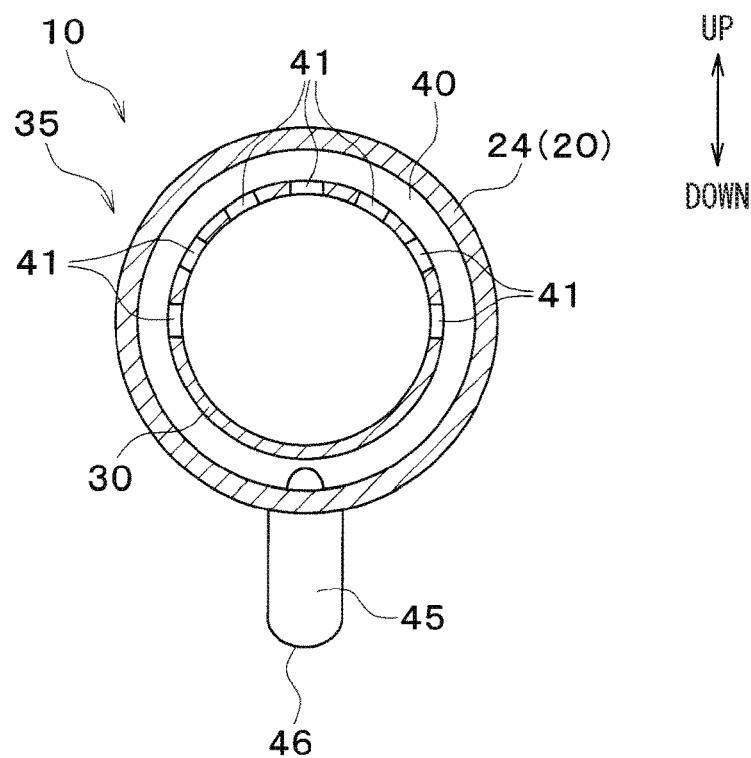
FIG. 10 is a cross-sectional view showing the placement of multiple communication holes in the liquid recovery device according to the third embodiment.

In the liquid recovery device 10 according to the third embodiment, the multiple communication holes 41 communicate the inside of the inner pipe 30 with the clearance part 40 at the upper portion of the inner pipe 30. As shown in FIG. 10, the multiple communication holes 41 are disposed at regular intervals in the circumferential direction of the inner pipe 30 at an upper portion of the inner pipe 30 above the center axis C. It should be noted that the multiple communication holes 41 in the third embodiment are disposed to be biased toward the upper side of the inner pipe 30 when the entire circumference of the inner pipe 30 is grasped as a target.

Therefore, in the liquid recovery device 10 according to the third embodiment, even when some communication holes 41 among the multiple communication holes 41 are closed by the liquid-phase fluid Fl, the flow of the gas-phase fluid Fg from the clearance part 40 to the inside of the inner pipe 30 can be ensured, and an increase in the pressure inside the clearance part 40 can be inhibited.

In other words, according to the liquid recovery device 10, the liquid-phase fluid Fl blocking the communication holes 41 is prevented from entering the inside of the inner pipe 30 by the pressure of the clearance part 40, and the reduction in the recovery rate of the liquid-phase fluid Fl can be inhibited.

Further, since each of the multiple communication holes 41 in the third embodiment is disposed on the upper portion of the inner pipe 30, the multiple communication holes 41 are located on the opposite side of the connection position of the drainage pipe 45 through the inner pipe 30. In other words, the liquid recovery device 10 can inhibit the liquid-phase fluid Fl from flowing into the inner pipe 30 through the communication holes 41.

An inflow flow velocity of the gas-phase fluid Fg into the clearance part 40 and a positional relationship of the drainage pipe 45 to the clearance part 40 will be considered. When the clearance part 40 is provided in the entire outer periphery of the inner pipe 30 as in the liquid recovery device 10, a resistance at the time of flowing into the clearance part 40 tends to increase as a distance from the connection position of the drainage pipe 45 increases. This tendency is caused by a longer path passing through the inside of the clearance part 40 before reaching the drainage pipe 45.

For that reason, the inflow flow velocity of the gas-phase fluid Fg to the clearance part 40 tends to decrease as the distance from the connection position of the drainage pipe 45 increases due to the tendency of resistance in the clearance part 40. This deviation of the inflow flow velocity also causes a deviation of a flow velocity difference from the inflow flow velocity of the gas-phase fluid Fg with respect to the inside of the inner pipe 30.

In other words, the farther from the connection position of the drainage pipe 45, the greater the difference in flow velocity between the gas-phase fluid Fg and the inflow flow velocity to the inside of the inner pipe 30, and when the flow rate of the gas-liquid two-phase fluid increases, the vortex flow is apt to occur in the portion where the fluid flows into the clearance part 40.

As shown in FIG. 9, in the liquid recovery device 10 according to the third embodiment, the downstream side wall portion 25 is inclined so as to be positioned on the upstream side in the flow direction as the distance from the center axis C increases in the upper portion of the double pipe portion 35. The wall surface of the downstream side wall portion 25 forms a wall surface inclination angle β with respect to a reference position Pc corresponding to a connection position of the drainage pipe 45. As described above, the upper portion of the double pipe portion 35 is located on the opposite side of the connection position of the drainage pipe 45 through the inner pipe 30.

In the upper portion of the double pipe portion 35 according to the third embodiment, the gas-phase fluid Fg flowing into the clearance part 40 flows downstream in the flow direction inside the clearance part 40, and reaches the downstream side wall portion 25. Since the downstream side wall portion 25 is configured to be inclined at the wall surface inclination angle β the flow of the gas-phase fluid Fg can be guided toward the drainage pipe 45.

As a result, the inflow flow velocity of the clearance part 40, which corresponds to the upper portion of the double pipe portion 35, can be increased, and the deviation of the inflow flow velocity of the gas-phase fluid Fg in the entire clearance part 40 can be reduced. As a result, in the liquid recovery device 10, the downstream side wall portion 25 inclined at the wall surface inclination angle β is disposed so that the generation of the vortex flow in the portion where the fluid flows into the clearance part 40 away from the drainage pipe 45 can be inhibited, and the recovery rate of the liquid-phase fluid Fl can be improved.

As described above, according to the liquid recovery device 10 of the third embodiment, the gas-liquid two-phase fluid introduced from the introduction portion 21 of the outer pipe 20 can be separated into the gas-phase fluid Fg and the liquid-phase fluid Fl by passing through the double pipe portion 35 including the outer pipe 20 and the inner pipe 30, and the separated liquid-phase fluid Fl can be recovered through the drainage pipe 45.

As shown in FIGS. 9 and 10, the clearance part 40 and the inside of the inner pipe 30 are communicated with each other through the communication holes 41. Therefore, according to the liquid recovery device 10, even when the flow rate of the gas-liquid two-phase fluid introduced from the introduction portion 21 increases, the generation of the vortex flow in the portion where the fluid flows into the clearance part 40 can be inhibited, the flow of the liquid-phase fluid Fl to the clearance part 40 can be smoothed, and the liquid-phase fluid Fl can be recovered with a high recovery rate.

In the liquid recovery device 10, the drainage pipe 45 is connected to the clearance part 40 at the lower portion of the double pipe portion 35, and is disposed so that the drain pipe center Cd forms an acute inclination angle α with respect to the center axis C.

As a result, the liquid recovery device 10 can smoothen the flow of the fluid from the clearance part 40 toward the drainage pipe 45, and can further inhibit the generation of the vortex flow in the portion where the fluid flows into the clearance part 40.

As shown in FIG. 10, in the third embodiment, the multiple communication holes 41 communicate the inside of the inner pipe 30 with the clearance part 40 at the upper portion of the inner pipe 30. The upper portion of the inner pipe 30 is opposite to the connection position of the drainage pipe 45 through the inner pipe 30.

As a result, according to the liquid recovery device 10, since the communication holes 41 are disposed in a portion where the liquid-phase fluid Fl is small in the distribution of the liquid-phase fluid Fl in the clearance part 40 due to the action of gravity, the liquid-phase fluid Fl can be prevented from flowing into the inner portion of the inner pipe 30 through the communication holes 41.

In addition, even when some communication holes 41 among the multiple communication holes 41 are closed by the liquid-phase fluid Fl, the flow of the gas-phase fluid Fg from the clearance part 40 to the inside of the inner pipe 30 can be ensured. In other words, according to the liquid recovery device 10, the liquid-phase fluid Fl closing the communication holes 41 can be inhibited from entering the inside of the inner pipe 30 by the pressure of the clearance part 40.

As shown in FIG. 9, in the liquid recovery device 10 according to the third embodiment, the downstream side wall portion 25 in the upper portion of the double pipe portion 35 is inclined so as to be positioned on the upstream side in the flow direction as the distance from the center axis C increases. The wall surface of the downstream side wall portion 25 forms a wall surface inclination angle β with respect to a reference position Pc corresponding to a connection position of the drainage pipe 45.

As a result, the flow of the gas-phase fluid Fg flowing into the clearance part 40 at the upper portion of the double pipe portion 35 can be guided to the drainage pipe 45 by the downstream side wall portion 25 inclined at the wall surface inclination angle β and the inflow flow velocity of the clearance part 40 at the upper portion of the double pipe portion 35 can be increased. As a result, the liquid recovery device 10 can inhibit the generation of the vortex flow in the portion where the fluid flows into the clearance part 40 away from the drainage pipe 45, thereby being capable of improving the recovery rate of the liquid-phase fluid Fl.

Fourth Embodiment

Next, a fourth embodiment different from the embodiments described above will be described with reference to FIG. 11. A liquid recovery device 10 according to the fourth embodiment configures a part of a fuel cell system 100 mounted on an electric vehicle (a fuel cell vehicle), similar to the embodiments described above.

The liquid recovery device 10 according to the fourth embodiment is disposed on a downstream side of the fuel cell 1 in an air passage 2 of the fuel cell system 100 similarly to the embodiments described above, and separates a gas-phase fluid Fg and a liquid-phase fluid Fl from a gas-liquid two-phase fluid discharged from a fuel cell 1 to recover a liquid-phase fluid Fl.

The liquid recovery device 10 is configured to include an outer pipe 20, an inner pipe 30, an exhaust pipe 31, and a drainage pipe 45, similarly to the embodiments described above. In the liquid recovery device 10 according to the fourth embodiment, the basic configuration is the same as that of the embodiments described above, but the configuration of communication holes 41 in the inner pipe 30 is different from that of the embodiments described above.

Figure 11:
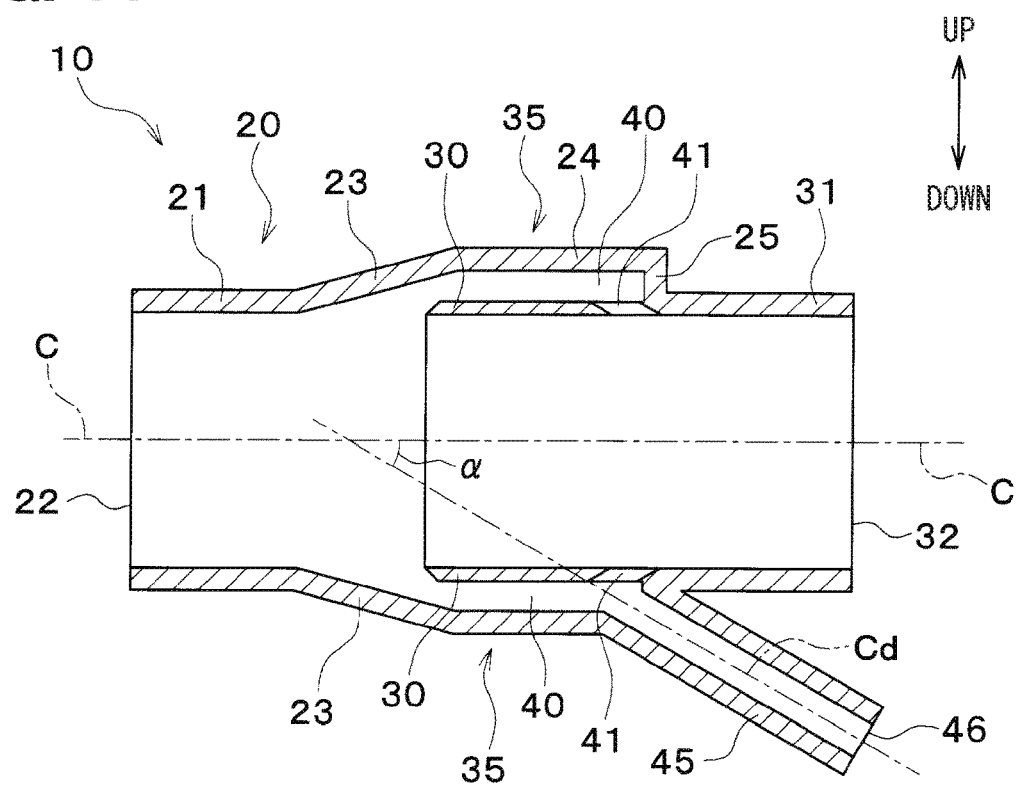
FIG. 11 is a cross-sectional view showing a configuration of a liquid recovery device according to a fourth embodiment.

As shown in FIG. 11, in the liquid recovery device 10 according to the fourth embodiment, the multiple communication holes 41 are disposed in a pipe wall of the inner pipe 30. Each of the communication holes 41 penetrates through the pipe wall of the inner pipe 30, so that the inside of the inner pipe 30 communicates with a clearance part 40 corresponding to the outside of the inner pipe 30. Therefore, according to the liquid recovery device 10, a part of the gas-phase fluid Fg flowing into the clearance part 40 can be returned to the inside of the inner pipe 30 through each of the communication holes 41. Each of the communication holes 41 in the fourth embodiment is inclined so as to be positioned on a downstream side in a flow direction toward a center axis C (that is, the inside of the inner pipe 30). With the configuration described above, a resistance of each of the communication holes 41 when the gas-phase fluid Fg flows into the inner pipe 30 from the clearance part 40 can be reduced.

The liquid recovery device 10 can increase the inflow flow velocity of the gas-phase fluid Fg into the clearance part 40 by reducing the resistance of each of the communication holes 41. As a result, even when the flow rate of the gas-liquid two-phase fluid introduced from the introduction portion 21 is large, the liquid recovery device 10 can inhibit the generation of the vortex flow in the portion where the fluid flows into the clearance part 40, and can improve the recovery rate of the liquid-phase fluid Fl.

As described above, according to the liquid recovery device 10 of the fourth embodiment, the gas-liquid two-phase fluid introduced from the introduction portion 21 of the outer pipe 20 can be separated into the gas-phase fluid Fg and the liquid-phase fluid Fl by passing through the double pipe portion 35 including the outer pipe 20 and the inner pipe 30, and the separated liquid-phase fluid Fl can be recovered through the drainage pipe 45.

As shown in FIG. 11, the clearance part 40 and the inside of the inner pipe 30 are communicated with each other through the communication holes 41. Therefore, according to the liquid recovery device 10, even when the flow rate of the gas-liquid two-phase fluid introduced from the introduction portion 21 increases, the generation of the vortex flow in the portion where the fluid flows into the clearance part 40 can be inhibited, the flow of the liquid-phase fluid Fl into the clearance part 40 can be smoothed, and the liquid-phase fluid Fl can be recovered with a high recovery rate.

Further, each of the communication holes 41 is inclined so as to be positioned on the downstream side in the flow direction toward the center axis C. With the configuration described above, a resistance of each of the communication holes 41 when the gas-phase fluid Fg flows into the inner pipe 30 from the clearance part 40 can be reduced.

The liquid recovery device 10 can increase the inflow flow velocity of the gas-phase fluid Fg into the clearance part 40 by reducing the resistance of each of the communication holes 41, and can inhibit the generation of the vortex flow in the portion where the fluid flows into the clearance part 40. As a result, the liquid recovery device 10 can recover the liquid-phase fluid Fl with a high recovery rate even when the flow rate of the gas-liquid two-phase fluid increases.

It should be appreciated that the present disclosure is not limited to the embodiments described above and can be modified appropriately within the scope of the appended claims. The embodiments above are not irrelevant to one another and can be combined appropriately unless a combination is obviously impossible.

(1) In the embodiment described above, the liquid recovery device 10 is applied to the fuel cell system 100, but the present disclosure is not limited to this configuration. The liquid recovery device can be applied to various devices and systems as long as the liquid recovery device is intended to separate a fluid in a gas-liquid two-phase state into a gas-phase fluid and a liquid-phase fluid and recover the liquid-phase fluid.

(2) Further, although the communication holes 41 in the embodiments described above penetrate through the pipe wall of the inner pipe 30 to communicate the clearance part 40 with the interior of the inner pipe 30, the present disclosure is not limited to the above configuration. As the communication holes, various configurations can be adopted as long as the clearance part and the inside of the inner pipe are communicated with each other.

Figure 12:
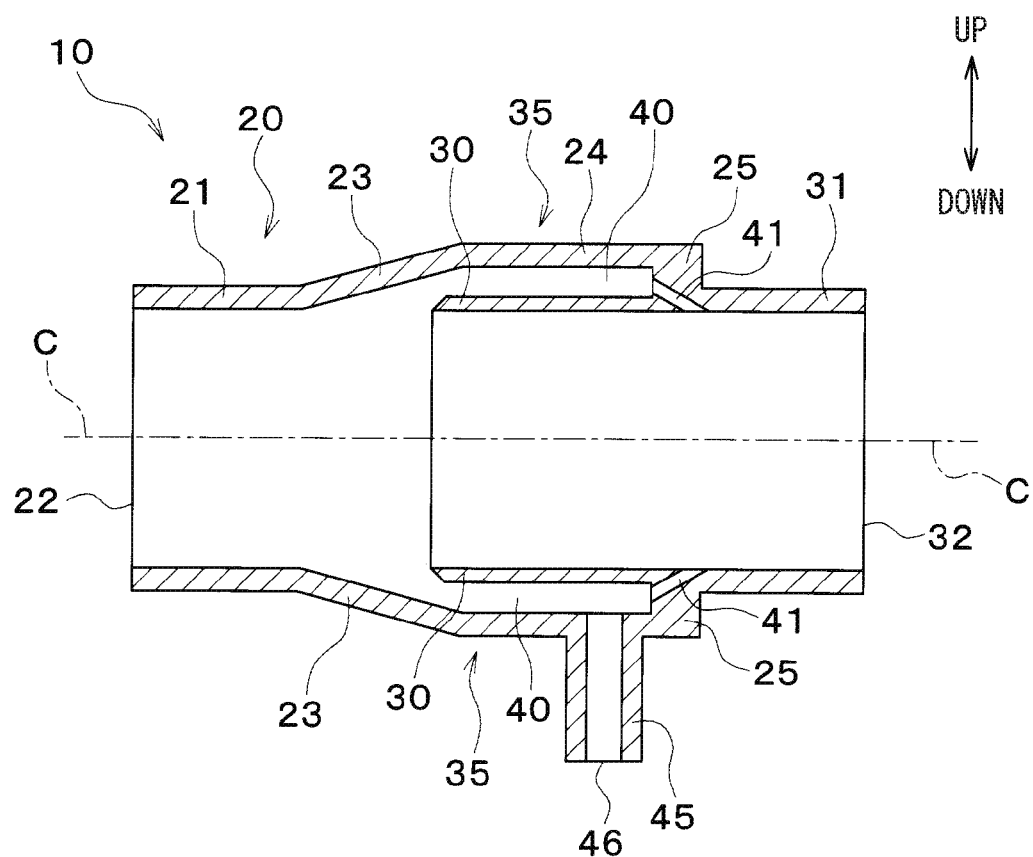
FIG. 12 is a cross-sectional view showing a modification of the liquid recovery device.

For example, as shown in FIG. 12, the multiple communication holes 41 can be provided so as to penetrate through the downstream side wall portion 25 and the pipe wall of the inner pipe 30. The communication holes 41 in this case extends from the downstream side wall portion 25 to be inclined so as to be positioned on the downstream side in the flow direction toward the center axis C, and is connected to the inside of the inner pipe 30 through the pipe wall of the inner pipe 30.

Even in the configuration of the communication holes 41, the inflow flow velocity of the gas-phase fluid Fg in the portion where the fluid flows into the clearance part 40 can be increased, and the recovery rate of the liquid-phase fluid Fl can be increased even when the flow rate of the gas-liquid two-phase fluid is increased.

(3) In the embodiments described above, the multiple communication holes 41 are disposed at different positions in the circumferential direction of the inner pipe 30, but the placement of the multiple communication holes 41 is not limited to the above example. The multiple communication holes 41 may be uniformly disposed at predetermined intervals as in the first embodiment and the third embodiment, or the intervals of the multiple communication holes 41 may be appropriately changed in accordance with the placement in the inner pipe 30.

(4) In the embodiments described above, the placement of the multiple communication holes 41 in the inner pipe 30 is referred to in the circumferential direction of the inner pipe 30, but the present disclosure is not limited to the above configuration. In other words, the multiple communication holes may be provided at different positions in the axial direction of the inner pipe (that is, in the flow direction of the gas-phase fluid Fg).

For example, one of the multiple communication holes 41 may be disposed upstream of the other communication holes 41 in the flow direction, and another communication hole 41 may be disposed downstream of the other communication holes 41 in the flow direction. The placement of each of the communication holes 41 in the flow direction may be determined with a certain regularity, or may be appropriately changed.

(5) In the embodiments described above, the communication holes 41 are provided by penetrating through the pipe wall of the inner pipe 30 configuring the double pipe portion 35, but the present disclosure is not limited to the above configuration. For example, the entire inner pipe 30 configuring the double pipe portion 35 may be made of a porous material, and the pores of the porous material may be used as communication holes. In this case, the porous material is a member made of a material having a large number of pores, and includes a mesh-like member or a sponge-like member.

The porous material described above can be disposed in the opening penetrating through the pipe wall of the inner pipe 30. In other words, a part of the inner pipe 30 configuring the double pipe portion 35 may be replaced with a porous material. Even in the above configuration, since the gas-phase fluid Fg can be returned from the clearance part 40 to the inside of the inner pipe 30 through the communication holes 41, the same effects as those of the embodiments described above can be exhibited.

(6) In the embodiments described above, a hydrophilic functional group (for example, a hydroxyl group or a carboxyl group) is directly applied to the surface to give hydrophilicity to the surface of the inner wall of the introduction pipe, but the present disclosure is not limited to the above configuration. As long as hydrophilicity can be imparted to the surface of the inner wall of the introduction pipe, various methods can be employed, and for example, plasma treatment, photocatalyst, fine concavo-convex shape, coating formation, and the like may be performed.

(7) In the embodiments described above, the outer pipe 20, the inner pipe 30, the exhaust pipe 31, and the drainage pipe 45 are described as cylindrical pipes, but the present disclosure is not limited to the above example. Each configuration may configure a flow channel through which the fluid can pass, and the cross-sectional shape of the flow channel is not limited.

For example, a flow channel having a polygonal cross-sectional shape or a flow channel having an elliptical cross-sectional shape can be used. The external appearance of the outer pipe 20, the exhaust pipe 31, and the drainage pipe 45 in the liquid recovery device 10 can be changed as appropriate.

What is claimed is:

1. A liquid recovery device comprising:
    an outer pipe that includes an introduction portion into which a gas-liquid two-phase fluid is introduced;
    an inner pipe disposed inside the outer pipe at a position downstream of the introduction portion in a flow direction of the gas-liquid two-phase fluid to discharge a gas-phase fluid separated from the gas-liquid two-phase fluid;
    a double pipe portion provided at a downstream side of the outer pipe in the flow direction, a clearance part being defined between an inner side of the outer pipe and the inner pipe, the inner pipe being located at a predetermined distance from the inner side of the outer pipe;
    a communication hole that communicates the inner side of the inner pipe with the clearance part; and
    a drainage portion connected to the clearance part to discharge a liquid-phase fluid flowing into the clearance part, wherein
    the drainage portion is disposed to extend in a direction that forms an acute angle with respect to an extending direction of the inner pipe on the downstream side in the flow direction.

2. The liquid recovery device according to claim 1, further comprising
    a downstream side wall portion that closes a space between the outer pipe and the inner pipe on the downstream side of the double pipe portion in the flow direction, wherein
    the downstream side wall portion is located on a side opposite to a connection position of the drainage portion through the inner pipe, and
    the downstream side wall portion is inclined to be positioned on the upstream side in the flow direction as the downstream side wall portion is further away from a center axis of the outer pipe.

3. The liquid recovery device according to claim 1, wherein the communication hole communicates the inside of the inner pipe with the clearance part at a plurality of locations.

4. The liquid recovery device according to claim 1, wherein the communication hole is disposed on a side opposite to a connection position of the drainage portion through the inner pipe.

5. The liquid recovery device according to claim 1, wherein the communication hole is inclined to be positioned on the downstream side in the flow direction toward the inside of the inner pipe.

6. A liquid recovery device comprising:
    an outer pipe that includes an introduction portion into which a gas-liquid two-phase fluid is introduced;
    an inner pipe disposed inside the outer pipe at a position downstream of the introduction portion in a flow direction of the gas-liquid two-phase fluid to discharge a gas-phase fluid separated from the gas-liquid two-phase fluid;
    a double pipe portion provided at a downstream side of the outer pipe in the flow direction, a clearance part being defined between an inner side of the outer pipe and the inner pipe, the inner pipe being located at a predetermined distance from the inner side of the outer pipe;

a communication hole that communicates the inner side of the inner pipe with the clearance part;

a drainage portion connected to the clearance part to discharge a liquid-phase fluid flowing into the clearance part; and a downstream side wall portion that closes a space between the outer pipe and the inner pipe on the downstream side of the double pipe portion in the flow direction, wherein the downstream side wall portion is located on a side opposite to a connection position of the drainage portion through the inner pipe, and the downstream side wall portion is inclined to be positioned on the upstream side in the flow direction as the downstream side wall portion is further away from a center axis of the outer pipe.

7. The liquid recovery device according to claim 6, wherein the communication hole communicates the inside of the inner pipe with the clearance part at a plurality of locations.

8. The liquid recovery device according to claim 6, wherein the communication hole is disposed on a side opposite to a connection position of the drainage portion through the inner pipe.

9. The liquid recovery device according to claim 6, wherein the communication hole is inclined to be positioned on the downstream side in the flow direction toward the inside of the inner pipe.

* * * * *